United States Patent

[11] 3,595,999

[72] Inventor Martin Alan Cole
10368 Starca, Whittier, Calif. 90601
[21] Appl. No. 782,344
[22] Filed Dec. 9, 1968
[45] Patented July 27, 1971

[54] AUTOMATIC TELEPHONE ALARM APPARATUS
8 Claims, 2 Drawing Figs.

[52] U.S. Cl. .......... 179/6 D, 179/5 P
[51] Int. Cl. .......... H04m 1/64, H04m 11/04
[50] Field of Search .......... 179/6 D, 5 P, 90 BB, 90 BD, 100.2 S, 100.2 MI, 100.3 D, 100.3 B, 100.4 D; 340/221

[56] References Cited

UNITED STATES PATENTS

| | | | |
|---|---|---|---|
| 2,396,409 | 3/1946 | Berzer | 179/100.2 |
| 3,287,500 | 11/1966 | Moore | 179/6 X |
| 3,310,793 | 3/1967 | Takarabe | 340/221 |
| 3,389,231 | 6/1968 | Brundage | 179/100.4 |
| 3,401,234 | 9/1968 | Heald | 179/5 |
| 3,445,600 | 5/1969 | Todd | 179/6 |
| 3,482,045 | 12/1969 | Chase | 179/5 |

*Primary Examiner*—Stanely M. Urynowicz, Jr.
*Assistant Examiner*—Raymond F. Cardillo, Jr.
*Attorney*—Spensley and Horn

ABSTRACT: An automatic telephone alarm apparatus for transmitting simulated dialing pulses to a switched telephone network and prerecorded voice messages to the selected telephone instrument. Message groups are stored on multitrack magnetic tape and are played back using a standard audio tape cartridge playback unit. The specific track to be played back is determined by the presence of one or more external stimuli. The selection of a specific message group from the plurality of groups recorded on a single tape track is determined by a combination of the presence of one or more external stimuli and a detection circuit responsive to a specific recorded audio tone header which precedes each message. The occurrence of an external signal initiates the switching of the telephone line from a telephone instrument to the system's output, transmission of the recorded simulated selection pulses to the telephone network, and transmission of the recorded message to the selected telephone instrument.

INVENTOR.

MARTIN ALAN COLE,

By His Attorneys

Spensley & Horn

AUTOMATIC TELEPHONE ALARM APPARATUS

An automatic telephone alarm apparatus for transmitting simulated dialing pulses to a switched telephone network and prerecorded voice messages to the selected telephone instrument. Message groups are stored on multitrack magnetic tape and are played back using a standard audio tape cartridge playback unit. The specific track to be played back is determined by the presence of one or more external stimuli. The selection of the specific message group from the plurality of groups recorded on a single tape track is determined by a combination of the presence of one or more external stimuli and a detection circuit responsive to a specific recorded audio tone header which precedes each message. The occurrence of an external signal initiates the switching of the telephone line from a telephone instrument to the system's output, transmission of the recorded simulated selection pulses to the telephone network, and transmission of the recorded message to the selected telephone instrument.

BACKGROUND OF THE INVENTION

The invention relates generally to data transmission systems, but specifically to an improved automatic calling device to select a remote telephone instrument on a switched telephone network and transmits prerecorded voice messages to that remote location. In many fields of business and technology there is a need for a system which can automatically transmit recorded voice messages to remote sites. Examples of such needs are intrusion alarms, fire alarms, and process control systems.

The problems which have arisen are associated with the communication media. The prior art discloses two basic methods:

1. Mechanical dialing devices:
2. Complex pulsing units to transmit dialing pulses.

The disadvantages which are inherent to a mechanical system are based on the method of operation. Since a device must be constructed which can rotate the telephone dial, the mechanics of the system will be complex, bulky, and expensive. In addition, attaching a mechanical structure to the telephone dial will, by its nature, make the telephone inoperative for normal use. The second basic class of systems require complex external pulsing units to transmit the dialing numbers.

A problem which is associated with both classes of prior art is the number of message groups available for transmission and the selection of those messages, where one or more message groups comprises a class and each class is associated with different external stimuli. Where simulated dialing pulses are prerecorded on magnetic tape, and these are the basis for the dialing operations, the prior art discloses no means by which the system can distinguish between different classes of message groups recorded on a single magnetic tape track. It is a purpose of this invention to provide a system whereby multiple message groups can be stored on a single recorded track of magnetic tape with a plurality of recorded track available, and where the system can selectively distinguish between the message groups.

SUMMARY OF THE INVENTION

The basic problem sought to be solved by the invention is to provide a system whereby prerecorded message groups containing pulse representations of telephone numbers and voice messages can be used to automatically dial remote telephone numbers and transmit messages to the remote site.

It is an object of the present invention to provide a system which allows a variety of external stimuli to initiate automatic electronic dialing of remote telephone numbers and transmission of prerecorded voice messages to that location.

It is a further object of the invention to use a standard multitrack tape recorder for message storage wherein a plurality of messages can be stored on a single track with each message group able to contain a different telephone number.

It is a still further object of the invention to directly couple to the telephone lines of a standard telephone instrument thereby leaving the instrument free for normal operation.

The invention utilizes a multitrack audio tape recorder for storing a plurality of message groups, each of which is associated with the occurrence of specific external stimuli. Each message group consists of four data fields. The data fields are: an audio tone header to identify the message group; a manifestation of a remote telephone number which will be called if the associated external stimulus occurs; a message to be transmitted; an audio tone disconnect signal.

The term audio frequency header is used to designate a recorded signal of a specific frequency which precedes a recorded message, and by the specific frequency, associates the message group with a specific external stimulus.

The message to be transmitted is typically a voice communication, but it could be a coded message for a teletype, computer, or other similar receiving device.

When an external stimulus occurs from an intrusion alarm, fire alarm, or any other alarm system or process control device, the telephone line is switched from the telephone instrument to the output of the automatic message transmission system, the tape recorder is started, and a specific track associated with that stimulus is selected. The first output from the magnetic tape read-head is the audio tone header. This will be typically in the range of 100—300 Hz., e.g. 100 Hz. for message group one, 200 Hz. for message group two, and will be different for each class of message groups.

The specific audio tone header identifies the class. Each message group class is associated with a different external stimulus. The tone decoder circuit comprises multiple units each sensitive to a specific frequency band within the 100—300 Hz. range.

A single track can possess a plurality of message group classes, each of which will be associated with different external stimuli. If two message groups are assumed, No. 1 having an audio tone header of 100 Hz. and being associated with external stimulus No. 1, and No. 2 having an audio tone header of 150 Hz. and being associated with external stimulus 2. If external stimulus No. 2 was present as an input to the system, the switch associated with the audio band being read, i.e., 100 Hz., will close, but since that identifying audio tone is not related to the stimulus which occurred, the following telephone dialing pulses will not be transmitted to the external telephone network. By this procedure incorrect calls will be prevented.

When the second message group is read, the 150 Hz. audio tone header will correlate to external stimulus 2, and the subsequent dialing pulses will open and close the telephone line at the proper time intervals necessary to provide dialing of the predetermined number. After transmission mission of the message, a disconnect audio tone will be detected, disconnecting the telephone line. The end of loop signal from the tape playback unit will reset the system.

DESCRIPTION OF THE DRAWINGS

The novel features which are believed to be characteristic of the invention both as to its organization and method of operation together with further objects and advantages thereof will be understood from the following description considered in connection with the accompanying drawing in which a presently preferred embodiment of the invention is illustrated by way of example.

In the drawing.

DESCRIPTION OF THE PRESENTLY PREFERRED EMBODIMENTS

Figure 1:
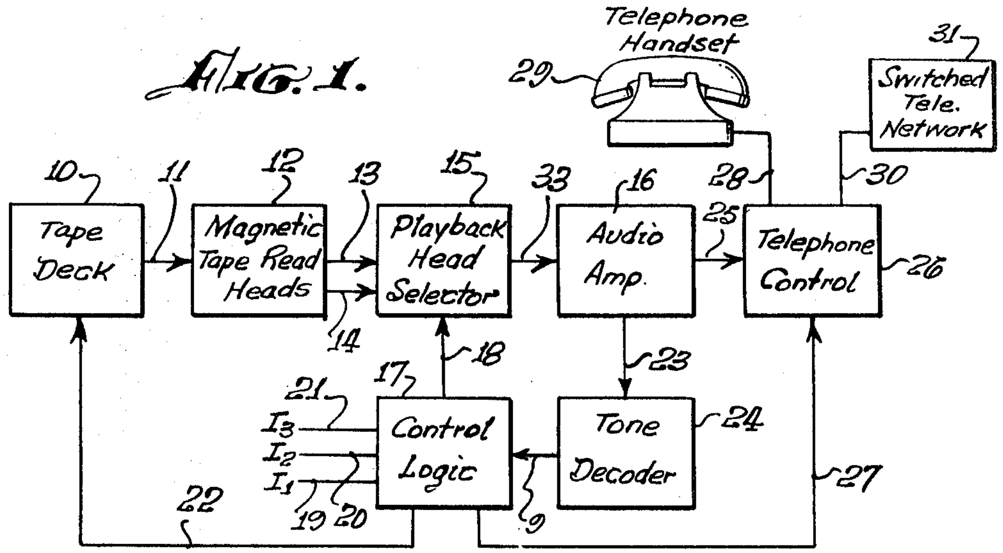
FIG. 1 is a schematic diagram in block form of the preferred embodiment of the invention.

A first embodiment of applicant's invention is shown in FIG. 1. The automatic message transmission system there shown comprises a magnetic tape play- back unit 10 with a plurality of associated magnetic tape read-heads 12, a read-head selector 15, a telephone control 26, a tone decoder 24, an audio amplifier 16 and control logic 17.

The magnetic tape playback unit 10 is preferably a tape deck able to mount and operate an endless loop, multitrack tape cartridge, but the tape playback unit 10 could be any standard audio tape recorder. When a tape cartridge playback unit is used, it has the advantage of mounting ease, no threading requirements, and the end of loop signal from the tape can be used to reset the playback unit 10. By mechanical coupling 11 such as rivets or bolts and nuts, the magnetic tape read-heads 12 are joined to the tape playback unit 10. The number of read-heads 12 will be equal to the number of recorded tape tracks. The number of tape read-heads 12 is typically two, but this could be any number consistent with standard track spacing techniques and read-head size. It is well known in the art for cartridge tape playback units to have as many as eight tracks. The output of the two read-heads 12 appear on lines 13 and 14.

The playback head selector 15 can be any switching device having a sufficient number of switching alternatives to account for all read-heads 12. The switching device is typically an electromechanical relay, but could be an electronic switching device. Although the alternative devices can produce equivalent functions, a relay is the preferred choice because of the low frequency signals being switched and the cost of the device.

The telephone control 26, switches the electrical signals going to and from the switched telephone network 31. The term "switched telephone network" is used because this is the standard terminology used by the common carriers for the standard dialing network The telephone control 26 is one or more electromechanical or semiconductor switches which provide for a pair of switching paths for the telephone lines, and which can be controlled by control logic 17. The telephone control 26 will connect either the telephone instrument 29 or the automatic message transmission system to the switched telephone network 31. Which one is connected to the switched telephone network 31 will depend upon signals from the control logic 17. If the automatic message transmission system is in a quiescent state, the telephone instrument 29 will be connected to the telephone control 26 via line 28. The telephone control 26 will transfer the signals on line 28 to line 30 and therefore to the switched telephone network 31. If the automatic message transmission system is activated, the prerecorded message group will be transmitted to the switched telephone network 31 via line 30. When a message group is transmitted will depend on signals from the audio amplifier 16 appearing on line 25 or from the control logic 17 appearing on line 27.

The tone decoder 24 is a device with a plurality of switching contacts each responsive to the specific audio frequency signals read from the magnet tape. Each track of the magnetic tape can contain multiple classes of message groups with a message group divided into four data fields. The first data field is an audio frequency header which identifies the correlation between a recorded voice message and an external stimulus. The audio headers are typically in the range of 100—300 Hz. with a different frequency allocated to each external stimulus. The second data field is a simulated telephone number recorded as a sequence of tone pulses or multifrequency tone pairs in the case of a touch tone telephone. The sequence consists of a series of tones in the range of 1,000—2,000 Hz. to correspond to the presence or absence of a digit. The pulses occur at a rate of approximately 10.5 pulses per second with each pulse lasting approximately 50 milliseconds. The term pulse as used herein, refers to an AC signal at a frequency between 1,000—2,000 Hz. having a duration of 50 milliseconds. Each digit to be dialed is represented by the proper tone with the number of tone pulses equal to the digits. The third data field is the message. The fourth data field is an audio frequency signal in the range of 100—300 Hz. This audio frequency signal indicates a disconnect signal and has a duration of approximately 1 second.

The tone decoder 24 receives the output of the read-head selector 15 via the audio amplifier 16. The input signal to the tone decoder 24 appears on line 23. The output of the tone decoder 24 appears on line 9. The audio frequency header of the message group being read will cause one of the tone decoder switching contacts to close. The control logic 17 will correlate this switch closure with the presence or absence of an external stimulus on leads 19, 20, or 21. If the audio frequency header being read corresponds to an external stimulus which has not occurred, the control logic 17 will produce an output signal on line 27 inhibiting the telephone control 26 from transmitting the second data field, i.e., dialing pulses, to the switch telephone network 31. If the audio tone header corresponds to an external stimulus which is present, the tone decoder 24 will enable the telephone control 26, via the control logic 17, to transmit the simulated telephone number. After the message is transmitted, the disconnect audio frequency tone will be detected by the tone decoder 24 with a resulting reset signal to the telephone control 26.

The audio amplifier 16 is typically one or more standard transistor stages which can provide sufficient electrical current to operate a transistor or electro mechanical switch. The output of the audio amplifier appeared on line 25 The signal on line 25 is used as an input to the telephone control 26 wherein the presence of the proper signal will inhibit the telephone control 26 from transmitting the message groups being read at the magnetic tape read-heads 12 The input to the telephone control 26 from the tone decoder 24 via control logic 17 appearing on line 27, constitutes the message to be transmitted. The input to the audio amplifier 16 from the read-head selector 15, appearing on line 33, inhibits transmission when the message group being read does not correspond to the external stimulus which is present.

The control logic 17 comprises the electrical circuits necessary to interconnect and properly sequence the magnetic tape playback unit 10, the read-head selector 15, the tone decoder 24, and the telephone control 26. $I_1$, $I_2$ and $I_3$ are a representative group of external stimulus inputs to the control logic 17. The inputs can be signals from an intrusion alarm, fire alarm, or any other alarm or process control device. The number of input is limited only by the presence of circuits adequate to distinguish between the number of inputs to the control logic 17. $I_1$, $I_2$, and $I_3$ appear on lines 19, 20, and 21 respectively. The presence of any external stimulus on lines 19, 20, or 21 to control logic 17 will result in an output signal on line 22 which will start the magnetic tape playback unit 10. In addition, the presence of any external stimulus to control logic 17 will result in an output signal on line 27 to the telephone control 26 causing the leads to the switched telephone network 31 to be switched to the automatic message transmission system. The presence of a specific external stimulus will result in an output signal on line 18 to the read-head selector 15 wherein the tape track associated with the external stimulus will be selected. After the proper track is selected by the read-head selector 15, the control logic 17 via the tone decoder 24 will correlate the identifying audio header with the external stimulus which has occurred.

Figure 2:
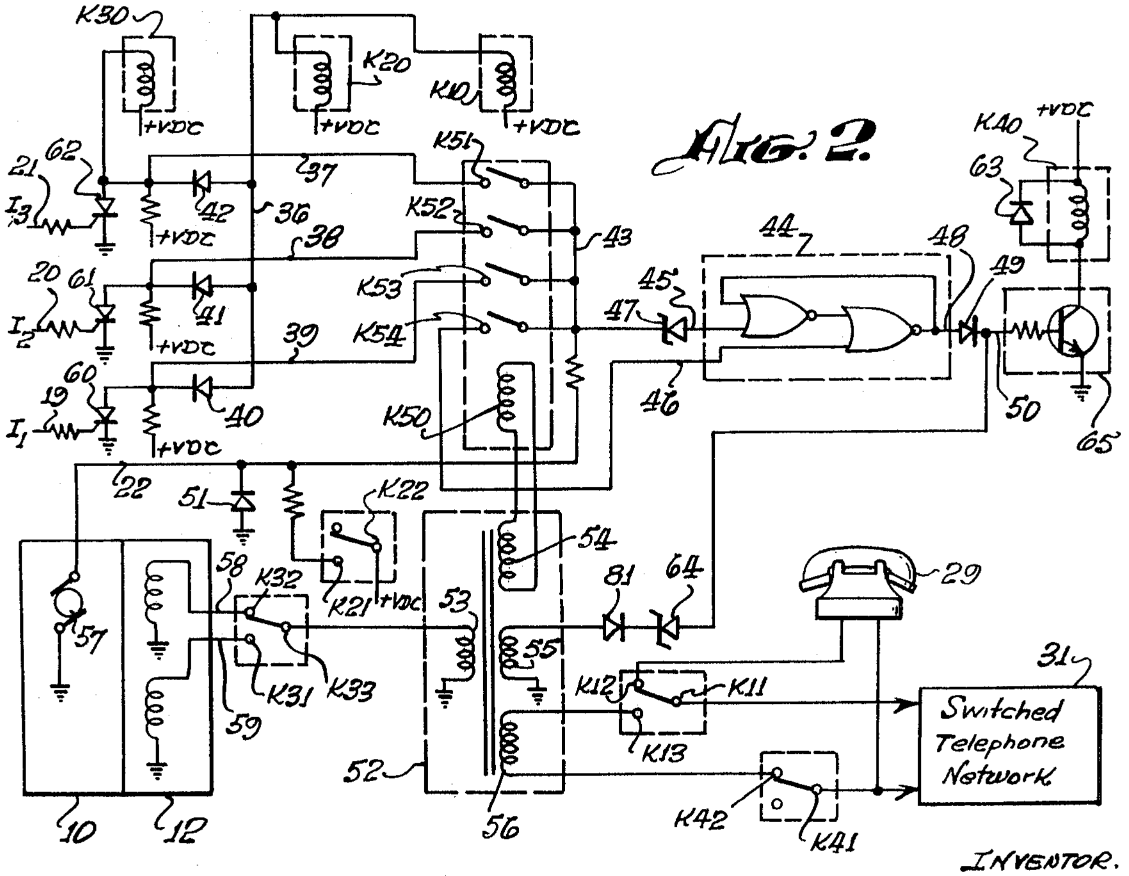
FIG. 2 is a schematic circuit diagram second embodiment of the invention showing typical circuitry for a system similar to but different from that shown in FIG. 1.

FIG. 2 shows the circuit details of a presently preferred embodiment of the applicant's invention. The external stimuli $I_1$, $I_2$, and $I_3$ appear on leads 19, 20, and 21 respectively. Each input line has associated with it a silicon controlled rectifier to identify the presence of the input signal. In the case of $I_1$, silicon controlled rectifier 60 has the cathode grounded, through blocking diode 40 the anode is connected to one lead of each of the relay coils K10 and K20 via line 36, and $I_1$ is, via line 19, connected to the gate of silicon controlled rectifier 60 through a resistor. $I_2$ is similarly connected to silicon controlled rectifier 61 which has the cathode grounded, through blocking diode 41 the anode is connected to one lead of each of the relay coils K10 and K20 via line 36, and $I_2$ is, via line 20, connected to the gate of silicon controlled rectifier 61 through a resistor. The contacts of a relay are designated by the decade range indicated by the coil number, i.e., K11, K12 and K13 are the contacts associated with relay coil K10. When either $I_1$ or $I_2$ is a nonzero voltage exceeding the silicon controlled rectifier gate threshold, relay coils K10 and K20 will be energized. One lead of both relay coils is connected to a positive DC voltage, therefore a current path is created on line 36 through the coils of K10 and K20, blocking diodes 41 or 42, and through the silicon controlled rectifier 60 or 61 to ground. When K10 is energized, the transformer secondary 56 will be connected to the switched telephone network 31 through relay contacts K13 and K11 thereby disconnecting the telephone instrument 29. Transformer 52 has a primary winding 53 and three secondary windings 54, 55, and 56. When K20 is energized the positive DC voltage on relay contact K22 will be connected to line 22 via contact K21 and a dropping resistor. Zener diode 51 will regulate the voltage on line 22 at the Zener breakdown voltage; this will activate the motor 57 of the magnetic tape playback unit 10. When $I_1$ or $I_2$ occur, both magnetic tape read-heads 12 will be active, but only output 58 will be connected to transformer primary 53 via relay contact K32 and K33.

When $I_3$ is the external stimulus with a signal which exceeds the gate threshold of silicon controlled rectifier 62, relay coils K10 and K20 will be energized by the current path created through blocking diode 42 and the silicon control rectifier 62 to ground. The result will be the same as that described for $I_1$ and $I_2$. In this case, relay K30 will also be energized through the silicon control rectifier 62. When relay K30 is energized, the read-head 12 selected will be changed such that output 59 will be connected to the transformer primary 53 via relay contacts K31 and K33.

The first data field to pass under the magnetic tape read-heads 12 is the audio frequency header. Depending on the state of relay K30, output 58 or 59 will be connected to the transformer primary 53. The voltage induced in transformer secondary 54 is connected to the coil relay K50. Relay K50 is a reed relay with each of the reed contacts dimensioned to be responsive to a different frequency.

Relay K50 correlates the presence of an external stimulus, i.e., $I_1$, $I_2$ or $I_3$, with the audio frequency header being read.

If $I_1$ is the cause of system activation, and the audio header frequency read corresponds to $I_2$, relay contact K52 will be connected to line 43 by reed action. Since $I_2$ is not present, the anode of silicon controlled rectifier 61 is at approximately the positive DC voltage. The positive DC voltage appears on line 43 via line 38 and reed contact K52. Zener diode 47 drops the voltage an amount equal to the Zener breakdown voltage thereby allowing the set-input 45 to flip-flop 44 to be within the power requirements of the flip-flop 44 components. The positive voltage at the set input 45 turns the flip-flop on producing a positive voltage on line 48. The positive voltage on line 48 will forward bias the diode 49 producing a positive voltage at input 50 causing amplifier 65 to conduct. Amplifier 65 will conduct because the single stage utilizes an NPN transistor, and the base-to-emitter voltage is positive. When amplifier 65 is in the conducting state, relay K40 will be energized. The diode 63 across the coil of relay K40 suppresses the high voltage created when relay K40 is deenergized; this prevents destruction of the collector-emitter junction of the transistor of amplifier 65. When relay K40 is energized, transformer secondary 56 will be disconnected from the switched telephone network 31 as the connection, via relay connects K42 and K41, is broken. This will break the current loop, therefore the second data field, i.e., the telephone number, will not be transmitted to the switched telephone network 31. When the disconnect data field is read, the audio frequency will be induced in relay coil K50. Reed relay contact K54 will close thereby applying the regulated positive voltage of Zener diode 51, appearing on line 22, to the reset-input 46 of flip-flop 44. When flip-flop 44 is reset, the output voltage of flip-flop 44 will fall below that required to cause amplifier 65 to conduct and relay K40 will be deenergized. By deenergizing relay K4, transformer secondary 56 will be reconnected to the switched telephone network 31 through relay contacts K41 and K42.

The discrimination of the signals at the set-input 45 and the reset-input 46 of flip-flop 44 is possible because of the difference in the Zener breakdown voltages of Zener diode 47 and Zener diode 51. The Zener breakdown voltage of Zener diode 47 will be lower than the Zener breakdown voltage of Zener diode 47. Through a limiting resistor, a positive bias voltage is supplied by Zener diode 51 to line 43 and therefore to the cathode of Zener diode 51. Since the bias voltage on line 43 is lower than the breakdown voltage of Zener diode 47, the voltage at set-input 45 is not sufficient to turn flip-flop 44 on. When the disconnect audio frequency header causes reed contact K54 to be connected to line 43, the direct application of the bias voltage to reset-input 46 is sufficient to reset flip-flop 44.

When the audio frequency header which corresponds to $I_1$ passes under the read-head 12, the signal will be induced in transformer secondary 54 causing the reed relay K50 to respond. In FIG. 2, reed relay contact K53 corresponds responds to the external stimulus $I_1$. When reed relay contact K53 closes, line 43 will be connected to the anode of silicon controlled rectifier 60 via line 39 and reed relay contact K53. Since $I_1$ caused silicon controlled rectifier 60 to conduct, the anode will be approximately at zero volts. With the voltage on line 43 at zero volts, the set-input 45 to flip-flop 44 will not be positive and the flip-flop 44 will not turn on. Since flip-flop 44 remains in the reset condition, diode 49 will not be forward biased and amplifier 65 will remain in the nonconductive state. With amplifier 65 in the nonconductive state, relay K40 is not energized and transformer secondary 56 remains connected to the switched telephone network 31.

Since the audio frequency header is identified as that which corresponds to the present external stimulus, the recorded manifestation of the telephone number will be sent to the switched telephone network 31. The sequence of electrical signals representing the selected telephone number is applied to transformer primary 53. A stepped up voltage is achieved by transformer action and appears at transformer secondary 55. The electrical signal is rectified and clipped by diode 81 and Zener diode 64 with the resulting signal used as the input 50 to amplifier 65. The amplifier 65 will alternately energize and deenergize relay K40 with the result the line to the switched telephone network 31 will be opened and closed by relay contacts K41 and K42 in synchronization with the simulated dialing digits. This simulates the action of a mechanical telephone instrument dial.

The fourth data field of each message group is the disconnect audio frequency tone. The tone has a 1 second duration. The signal is induced in the coil of reed relay K50 with the result relay contact K54 is connected to line 43. If flip-flop 44 had been set due the current message group not correlating with the present external stimulus, the flip-flop 44 will reset when the positive bias voltage is applied to reset-input 46. If the message group did correlate with the external stimulus, the signal will be induced in transformer secondary 55, rectified and clipped by diode 81 and Zener diode 64, and applied to amplifier 65 via input 50. This will cause amplifier 65 to conduct which will energize relay K40. By energizing relay K40, transformer secondary 56 will be disconnected from the switched telephone network 31 as the loop created through relay contacts K41 and K42 will be broken. This simulates hanging up the telephone handset.

To account for a delay in answering the call telephone, the voice message is delayed on the tape and also repeated several times. When the message is read, the signal is induced in transformer secondary 56 and transmitted to the switched telephone network 31.

I claim:

1. An automatic telephone signaling apparatus used in combination with a conventional telephone instrument for transmitting recorded messages on an external telephone network upon the input of external stimuli comprising:

a. playback means for a recording medium having multiple channels of recorded information;

b. read-head means coupled to said playback means for converting the channels of recorded messages from said recording medium into audio frequency electrical signals;

c. read-head selection means coupled to said read-head means for selecting a channel of audio frequency electrical signals and outputting same, the selection being dependent upon the external stimulus being input;

d. a message selection circuit including decoding means for correlating the input external stimulus with the output of said read-head selection means; and, e. telephone control means for transmitting the recorded message on the external telephone network, bypassing the telephone instrument when the recorded message output from said read-head selection means is correlated with the input external stimulus at said message selection circuit.

2. An automatic telephone signaling apparatus as in claim 1, wherein said playback means is a multiple track, endless loop tape recorder.

3. An automatic telephone signaling apparatus as in claim 1, wherein said decoding means includes a reed relay having a plurality of reed contacts each being adapted to be responsive to different audio frequencies and an actuating coil responsive to the audio frequency electrical signal output of said read-head selection means, said reed relay providing an input signal to said telephone control means, whereby a recorded message will be transmitted only when an input external stimulus is correlated with a predetermined one of said reed contacts.

4. An automatic telephone signaling apparatus used in combination with a conventional telephone instrument for transmitting one of a plurality of recorded messages each having an audio frequency header to any given remote location on an external telephone network upon the input of external stimuli, said apparatus comprising:

a. a magnetic tape recording apparatus having multiple tracks of recorded messages thereon;

b. read-heads coupled to each track of said magnetic tape recording apparatus, said read-head being adapted to output electrical audio frequency signals;

c. a plurality of input stimulus circuits each outputting an electrical signal identifying the presence or absence of an external stimulus;

d. a read-head selection circuit including at least first switching means for selecting one of said read-heads and outputting the electrical audio frequency signals therefrom upon the input of an electrical signal from one of said input stimulus circuits;

e. a message selection circuit including decoding means for correlating the output of one of said input stimulus circuits and the audio frequency header of the output of said read-head selection circuit; and, f. telephone control means for transmitting the recorded message on the external telephone network bypassing the telephone instrument when the audio frequency header of the recorded message output from said read-head selection circuit is correlated with the output of said input stimulus circuit.

5. An automatic telephone signaling apparatus as in claim 4, wherein said transmitted recorded message includes means for transmitting an oral message to a specific location on the telephone network.

6. An automatic telephone signaling apparatus as in claim 4, wherein said decoding means includes a reed relay having a plurality of reed contacts each being adapted to be responsive to different audio frequencies and an actuating coil responsive to the audio frequency output of said read-head selection circuit, said reed relay providing an input signal to said telephone control means whereby a recorded message will be transmitted only when the output of one of said input stimulus circuits is correlated with a predetermined one of said responding reed contacts.

7. An automatic telephone signaling apparatus as in claim 6, wherein said telephone control means comprises:

a. a binary switch having an input and output, the input of said switch being connected to said reed contacts, said binary switch being responsive to the output of said reed contacts when the output of one of said input stimulus circuits is correlated with the audio frequency header of a recorded message output from said read-head selection circuit; and, b. telephone switching means for bypassing the telephone handset and transmitting the recorded message on the external telephone network when said binary switch is responsive to the output of said reed contacts.

8. An automatic telephone signaling apparatus used in combination with a conventional telephone instrument for transmitting one of a plurality of recorded messages, each having an audio frequency header, dialing information and an oral message to any given remote location on an external telephone network upon the input of external stimuli; said apparatus comprising:

a. a magnetic tape playback recording means for magnetic recording media, said magnetic recording media having multiple tracks for storing said recorded messages;

b. read-heads coupled to each track of said magnetic tape recording apparatus, said read-heads being adapted to output electrical audio frequency signals;

c. a plurality of input stimulus circuits, each outputting an electrical signal identifying the presence or absence of an electrical stimulus;

d. a read-head selection circuit including at least first switching means for selecting one of said read-heads and outputting an audio frequency electrical signal derived therefrom upon the output of an electrical signal from one of said input stimulus circuits;

e. a reed relay having a plurality of reed contacts, each being adapted to be responsive to different audio frequencies and an actuating coil responsive to the audio frequency signal output of said read-head selection circuit, said reed contacts outputting an electrical signal when the output of an input stimulus circuit is correlated with the audio frequency header signal of a recorded message output from said read-head selection circuit;

f. a binary switch having an input and output, the input of said binary switch being connected to said reed contacts, said binary switch being responsive to the output of said reed contacts; and, g. telephone switching means for bypassing the telephone hand set and transmitting the recorded message on the external telephone network when said binary switch is responsive to the output of said reed contacts.